(12) United States Patent
Breay et al.

(10) Patent No.: US 6,880,859 B2
(45) Date of Patent: Apr. 19, 2005

(54) CONDUIT COUPLING ASSEMBLY (75) Inventors: Clifton P. Breay, Indian Hills, CO (US); Anthony Vaughan, Arvada, CO (US); Sara D. Lopata, Thornton, CO (US)

(73) Assignee: Stanley Aviation Corporation, Aurora, CO (US)

( * ) Notice: Subject to any disclaimer, the term of this patent is extended or adjusted under 35 U.S.C. 154(b) by 0 days.

(21) Appl. No.: 10/632,940

(22) Filed: Jul. 31, 2003

(65) Prior Publication Data

US 2005/0023824 A1 Feb. 3, 2005

(51) Int. Cl.[7] .............................. F16L 25/00; H03R 3/04
(52) U.S. Cl. .............................. 285/1; 285/53; 285/363; 439/192
(58) Field of Search .............................. 285/1, 53, 365, 285/363, 367, 364; 439/192, 100

(56) References Cited

U.S. PATENT DOCUMENTS

| | | | | |
|---|---|---|---|---|
| 3,753,205 A | * | 8/1973 | Tuger | 439/192 |
| 3,776,579 A | * | 12/1973 | Gale | 285/233 |
| 3,999,825 A | * | 12/1976 | Cannon | 439/192 |
| 4,008,937 A | | 2/1977 | Filippi | 339/15 |
| 4,249,786 A | | 2/1981 | Mahoff | 339/15 |
| 4,252,349 A | | 2/1981 | Mahoff | 285/238 |
| 4,346,428 A | | 8/1982 | Gale | 361/215 |
| 4,881,760 A | | 11/1989 | Runkles et al. | 285/93 |
| 4,900,070 A | | 2/1990 | Runkles et al. | 285/233 |
| 5,188,400 A | | 2/1993 | Riley et al. | 285/233 |
| 5,620,210 A | | 4/1997 | Eyster et al. | 285/81 |
| 5,786,976 A | | 7/1998 | Field | 361/215 |
| 5,959,828 A | | 9/1999 | Lewis et al. | 361/215 |

* cited by examiner

Primary Examiner—Eric K. Nicholson
(74) Attorney, Agent, or Firm—Sheridan Ross P.C.

(57) ABSTRACT

A conduit coupling assembly is provided for interconnecting a pair of fluid conveying members placed in a confronting relationship within the coupling assembly. The coupling assembly includes a longitudinally split coupler having a pair of coupling halves rotatable about a hinge. A plurality of engagement members are mounted on the respective coupling halves for connecting the coupling halves. Electrical conductivity is maintained across the coupling assembly by a bonding wire on each of the coupling halves. Each bonding wire provides multiple points of contact with the metallic flanges of the fluid carrying members. Optionally, the flanges of the fluid carrying members and the coupling assembly may be coated with a conductive coating thereby providing a redundant means to prevent buildup of an electrostatic charge.

38 Claims, 6 Drawing Sheets

Fig_1

Fig_2

Fig_5

Fig_6

Fig_7

Fig_8

Fig_8A

Fig_9

Fig_10

Fig_11

Fig_12

CONDUIT COUPLING ASSEMBLY

FIELD OF THE INVENTION

This invention relates to couplings for interconnecting a pair of confronting tubular members, and more particularly, to a conduit coupling assembly for interconnecting confronting ends of fluid conveying conduits.

BACKGROUND OF THE INVENTION

There are a number of prior art couplings which are used for interconnecting various types of fluid conveying lines or conduits. Depending upon the type of fluid to be conveyed, the prior art couplings may be designed to handle special safety requirements. Particularly for conduits which convey fuel, there is always a concern for designing a coupling so that an electrostatic charge does not build up on one of the coupled sections of the line. A stored electrostatic charge may give rise to the hazard of an electrical spark in the presence of vaporized fuel. Discharge of the spark by grounding, or by flexing of the coupling in such a manner to bring metallic parts of the coupling into contact with one another may cause instantaneous combustion of any vaporized fuel which in turn can cause ignition of the fuel conveyed in the lines. Buildup of an electrostatic charge by ionization of fuel as it is conveyed through the fuel lines can be referred to as a static buildup of an electric charge. Lightening strikes can also create a spark, and such strikes are commonly referred to as dynamic causes for creating an electrical charge. Thus, a coupling should also have the capability to dissipate a dynamic electrical charge, such as one caused by a lightening strike. Particularly for lightening strikes, it is important that the coupling have the capability to very quickly dissipate the electrical charge due to the potential magnitude of a spark caused by the lightening strike.

Despite the advances in coupling designs, most fluid conveying lines still utilize metallic flanges which are sealed to the coupling by deformable o-rings. These type of sealing rings may electrically insulate the coupled sections of the line from each other, thus any ionization of fuel that flows through the lines may give rise to a differential electrostatic charge between the coupled sections. Accordingly, there is still a need to ensure electrical conductivity across the coupled sections of the fuel lines to prevent electrostatic buildup.

Various types of electrical jumpers, also known as bonding jumpers, have been used in coupling designs to eliminate the hazard of differential electrostatic charges. A bonding jumper simply provides an electrically conductive connection between the coupled sections of line to prevent buildup of a charge. Two basic types of electrical jumpers include exteriorly and interiorly mounted jumpers. Externally mounted jumpers typically include a piece of flexible metal or cable which is detachably secured to the metallic flanges which are fixed to the adjacent ends of the coupled sections. In many of these prior art exteriorly mounted electrical jumpers, the jumpers themselves require some degree of assembly and disassembly which therefore makes it more difficult to efficiently couple and uncouple the fuel lines.

There are also a number of prior art references which disclose interiorly mounted bonding jumpers. Some of these jumpers are leaf spring types which are mounted within the coupling and placed in contact against the flanges, therefore maintaining electrical conductivity between the flanges of the fluid conveying lines. One particular disadvantage with many types of interiorly mounted bonding jumpers is that there is no means to visually inspect whether the bonding jumpers are properly positioned to make firm contact with the flanges.

Another method of preventing buildup of an electrostatic charge is the use of conductive coatings which may be applied to the coupling assembly and to the flanges of the fluid conveying members. Examples of references disclosing electrically conductive coatings are the U.S. Pat. Nos. 5,786,976 and 5,959,828.

By the foregoing, it is apparent that there still is a need for a coupling assembly which ensures electrical conductivity across adjacent ends of fluid conveying members in a manner which is easy for a user to confirm that the coupling assembly, to include the bonding jumper, is properly installed. Therefore, one of the objects of the present invention is to provide a coupling assembly of a simple yet reliable design which ensures electrical conductivity across the coupling to prevent electrostatic buildup between coupled sections of lines.

SUMMARY OF THE INVENTION

In accordance with the present invention, a conduit coupling assembly is provided which includes a pair of arcuate coupling halves that are joined at a hinge, and are placed in a locking position to join confronting ends of a pair of fluid conveying members. The general design for the coupling assembly of the present invention may be referred to as a threadless, clam-shell type coupling. The coupling assembly joins the flanges of the fluid conveying members in the conventional manner whereby the coupling halves extend circumferentially around the flanges, and the flanges each have at least one sealing member in the form of an o-ring or seal which is seated against the interior surfaces of the respective coupling halves. An electrical or bonding jumper is provided on each coupling half in the form of a continuous wire which spans the coupling half and provides multiple points of contact with both flanges of the fluid conveying members. The bonding jumpers are also positioned in contact with the group of components which couple the coupling halves. Thus, the redundant points of contact at various locations along the coupling ensure electrical conductivity across the coupling.

The bonding jumpers of the present invention are exteriorly mounted which enable the jumpers to be inspected with ease. Additionally, since the bonding jumpers are integrally designed with the components which lock the coupling assembly during use, there are no additional steps required to secure the bonding jumpers for placing the coupling in operation.

Yet another advantage of the present invention is the use of a plurality of opposing engagement members which are biased to hold the coupling assembly in a locked position. By using a redundant number of engagement members, inadvertent actuation of one of the engagement members will not result in uncoupling of the coupling assembly; rather, multiple points of pressure or force must be applied in uniform directions against the engagement members in order to uncouple the coupling assembly. In the preferred embodiment, each coupling half has a pair of engagement members.

Each of the other working or moving parts of the coupling assembly are exteriorly mounted which further allows for easy visual inspection and repair if required.

In addition to the conductive path across the coupling assembly by use of the bonding jumpers, current can also travel directly across the joined coupling halves by use of conductive coatings placed on the coupling halves. Thus, there are redundant conductive paths to prevent electrostatic charge buildup.

Additional features and advantages of the invention will become apparent from a review of the detailed description taken in conjunction with the accompanying drawings.

DETAILED DESCRIPTION OF THE DRAWINGS

Figure 1:
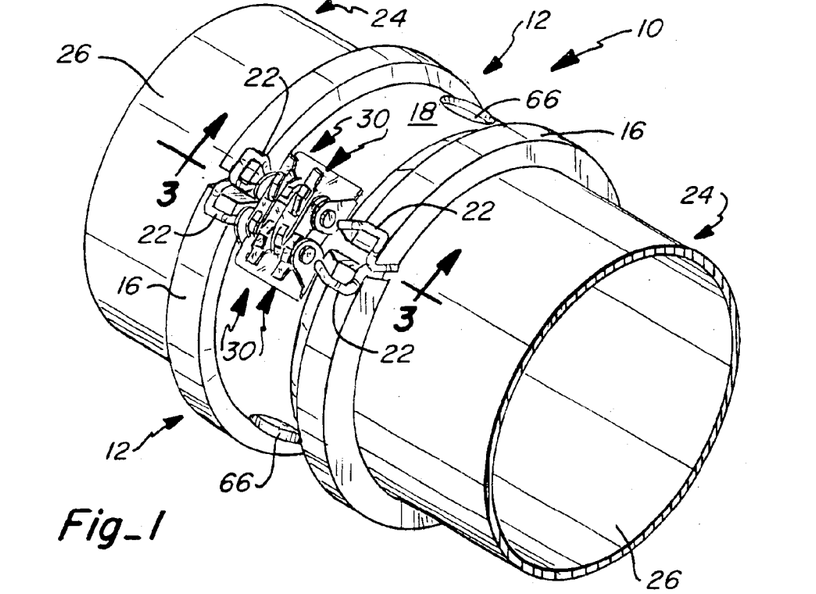
FIG. 1 is a perspective view of the conduit coupling assembly of the present invention shown as interconnecting a pair of fluid conveying members.
Figure 2:
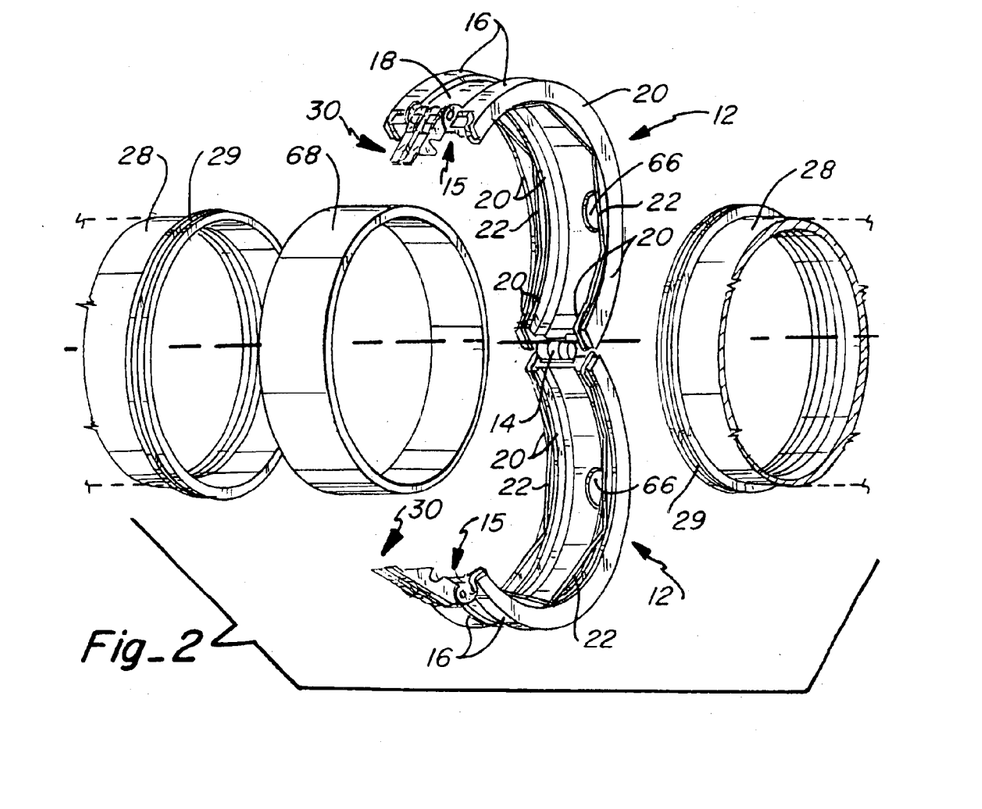
FIG. 2 is a perspective view of the conduit coupling assembly placed in the uncoupled or open position, also illustrating a pair of flanges separated from their respective lines, and an annular sleeve which spaces the flanges within the coupling assembly.

Referring to the drawings and particularly to FIGS. 1 and 2, the threadless, clam-shell type conduit coupling assembly of the present invention is generally indicated at 10. The coupling comprises a pair of coupling halves 12 which are hingedly connected at hinge 14. Each of the coupling halves terminate along a longitudinally extending face 15. These faces define the free ends of the coupling halves which are placed in a confronting position-to lock the coupling and to thereby secure the confronting ends of the fluid conveying members 24. The coupling halves are curved and traverse an arc of approximately 180°. On the exterior or exposed sides of the coupling halves at the transverse ends or edges thereof, each includes a pair of shoulders 16 interconnected by a web 18. On the interior sides of the coupling halves, each includes a pair of closely spaced annular walls 20 defining a groove therebetween which receives a portion of a bonding jumper/wire 22. Each coupling half further includes a pair of engagement members 30 mounted adjacent the face 15. Each engagement member 30 is secured over a corresponding support bar on the opposing coupling half to place the coupling in the locked position, as further discussed below. The bonding wires are indicated at 22 for each coupling half. Each bonding wire 22 is a continuous piece of conductive wire which has its free ends secured to the hinge plate 56 as further discussed below.

Figure 4:
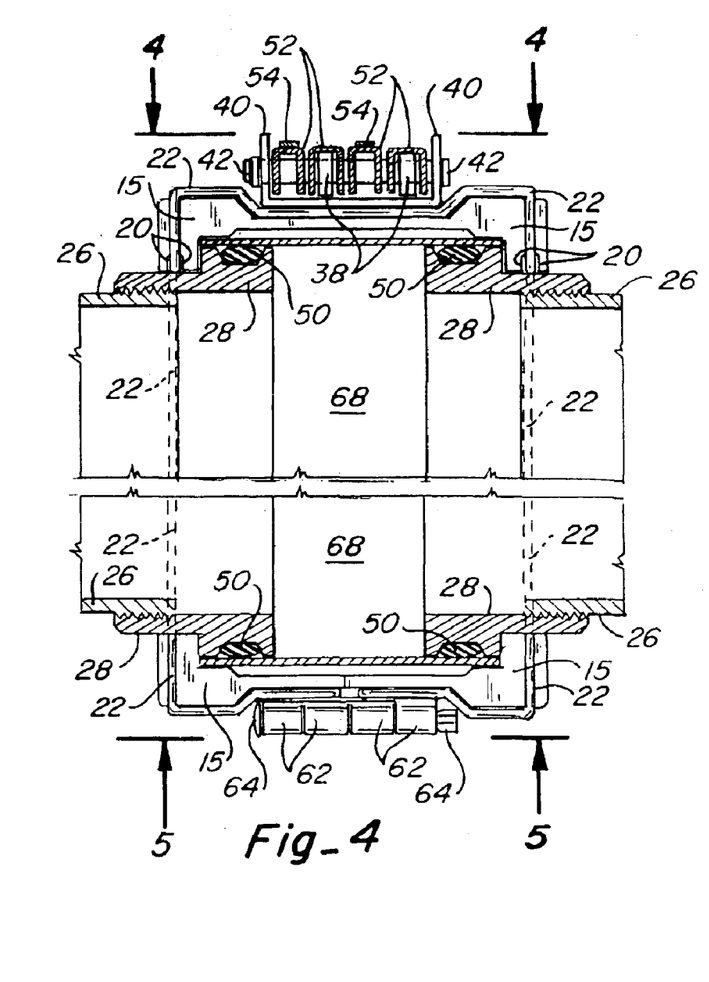
FIG. 4 is a vertical section taken along line 4—4 of FIG. 3 illustrating further details of the present invention to include the manner in which the flanges of the fluid conveying lines are sealed within the coupling assembly.

Referring to FIGS. 2 and 4, the fluid conveying members 24 usable with the coupling of the present invention are of the conventional type. Each member 24 includes a reinforced conduit member 26 and a metallic flange 28 which is secured at the end of the conduit member 26. An annular channel or groove 29 is formed in each flange 28 to receive an o-ring (FIG. 4). Although the figures illustrate a particular type of fluid conveying members 24, the present invention is not specifically limited to use with only this type.

As best seen in FIG. 4, the sleeve 68 spans or bridges the space between the opposed end faces of flanges 28, and the sleeve 68 peripherally surrounds and seats against the seal rings 50. Grooves 29 formed in the flanges are sufficiently shallow so that the outer peripheral edges of seal rings 50 protrude radially beyond the outer peripheral surface of the flanges, and the seal rings 50 are consequently deformed against the smooth, cylindrical inner periphery of sleeve 68. In this manner, sealing rings 50 establish a fluid tight seal between flanges 28 and sleeve 68. Optionally, the outer periphery of sleeve 68 may be roughened in a suitable manner to enable a person to grip the sleeve more firmly in the course of assembling the sleeve 68 over the flanges 28. Alternatively, the outer peripheral surface of sleeve 68 may be provided with corrugations to provide the desired gripping surface which keeps sleeve from slipping in the user's hand as one forces the sleeve over the seal rings 50. As also shown in FIG. 1, each of the coupling halves include a sight opening 66 which allows the user to visually inspect whether the annular sleeve 68 is in place.

As can be appreciated by a review of FIG. 4, the coupling of the present invention provides both an axial and an angular adjustment between the flanges thereby allowing the flanges to be located anywhere between the maximum extensions of the sleeve 68. Accordingly, the flanges 28 may be spaced from one another as shown in FIG. 4, or the flanges may be positioned so that the confronting faces of the flanges make contact with one another within the sleeve. Depending upon the particular design of the flanges, the flanges can either be spaced from one another within the sleeve or can be placed in contact with one another as described. For angular adjustment between the flanges, the diameter of the sealing rings 50 also determine the extent to which the fluid conduit members can angularly extend away from the coupling yet can still maintain a seal. Normally, the larger the sealing rings 50 are, the greater angular displacement which can be achieved with the fluid conveying members yet still ensuring a leak through path through the coupling.

Figure 5:
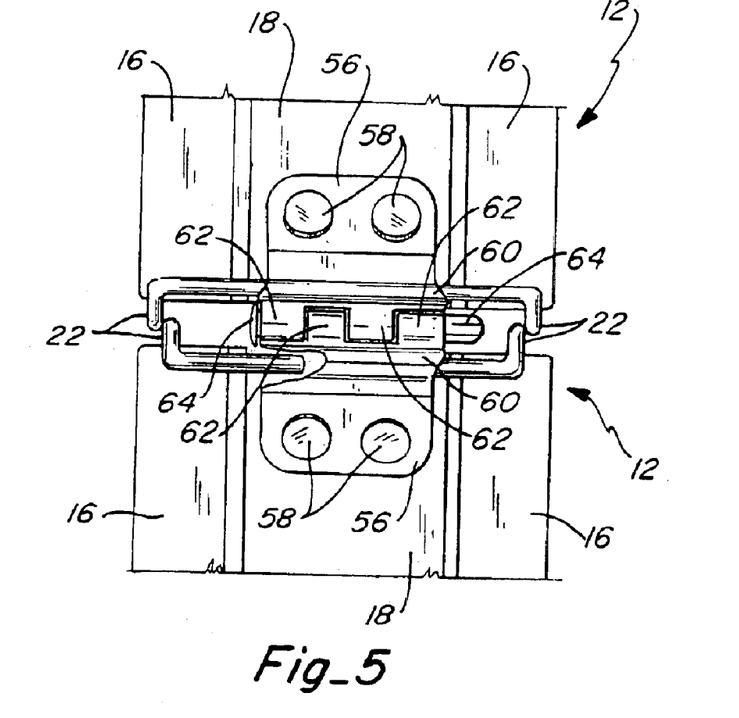
FIG. 5 is an enlarged plan view illustrating the hinge of the coupling assembly.
Figure 6:
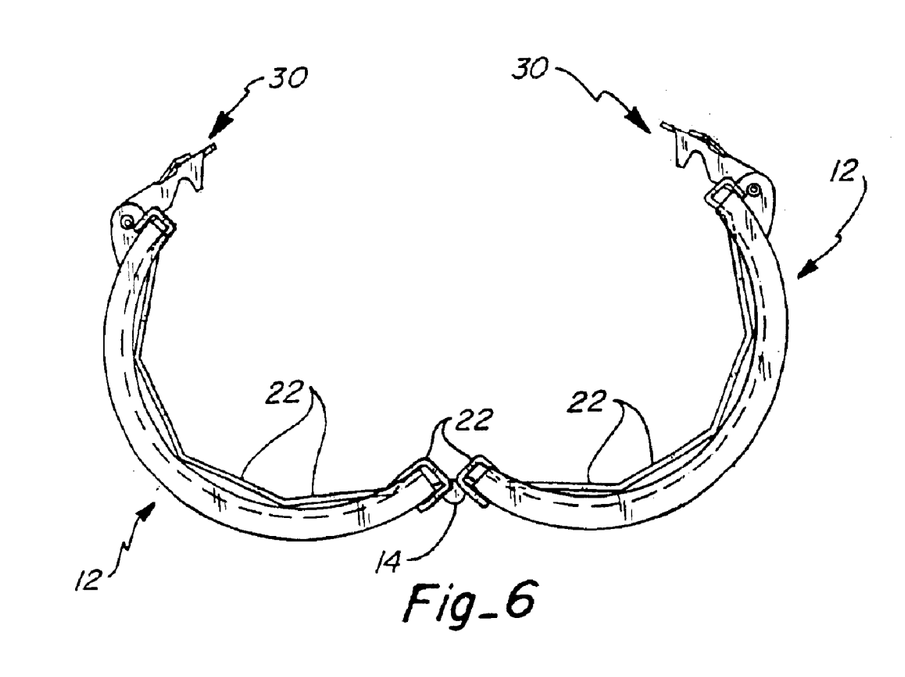
FIG. 6 is a elevation view of the present invention showing the coupling assembly in the open position.
Figure 7:
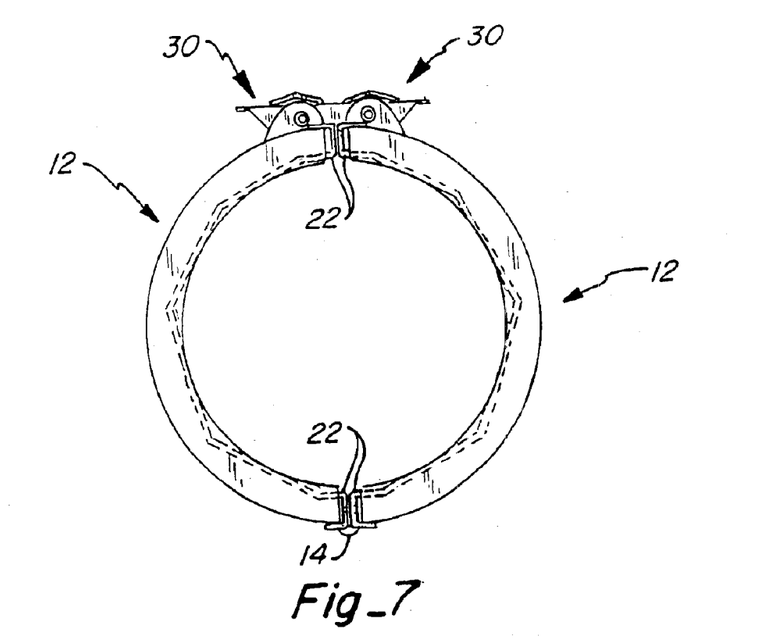
FIG. 7 is another elevation view showing the coupling assembly in the locked position.

Referring to FIG. 5, the hinge of the coupling assembly is illustrated which includes a pair of hinge plates 56 attached to their respective coupling halves as by rivets 58. Each of the hinge plates 56 include curved projections 60 and integral hinge sections 62. The hinge sections 62 are then joined by a hinge pin 64 extending longitudinally through the continuous opening formed by the joined hinge sections 62. As also shown in this figure, each bonding wire 22 has its free ends secured within the curved projections 60. One of the curved projections 60 is broken away to see the free end of a bonding wire secured therein.

Figure 3:
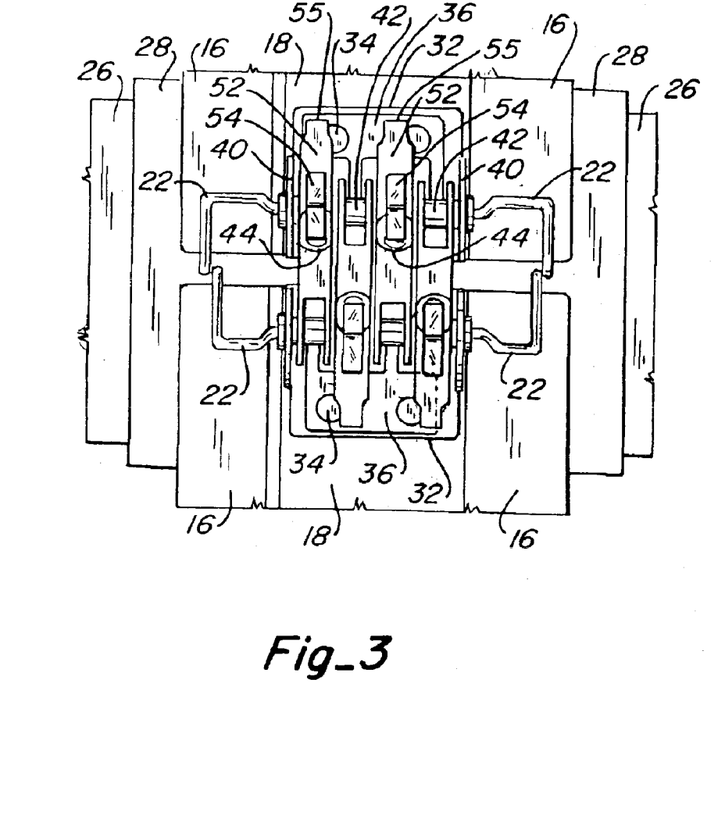
FIG. 3 is an enlarged plan view illustrating the coupling assembly in the locked or coupled position.
Figure 8:
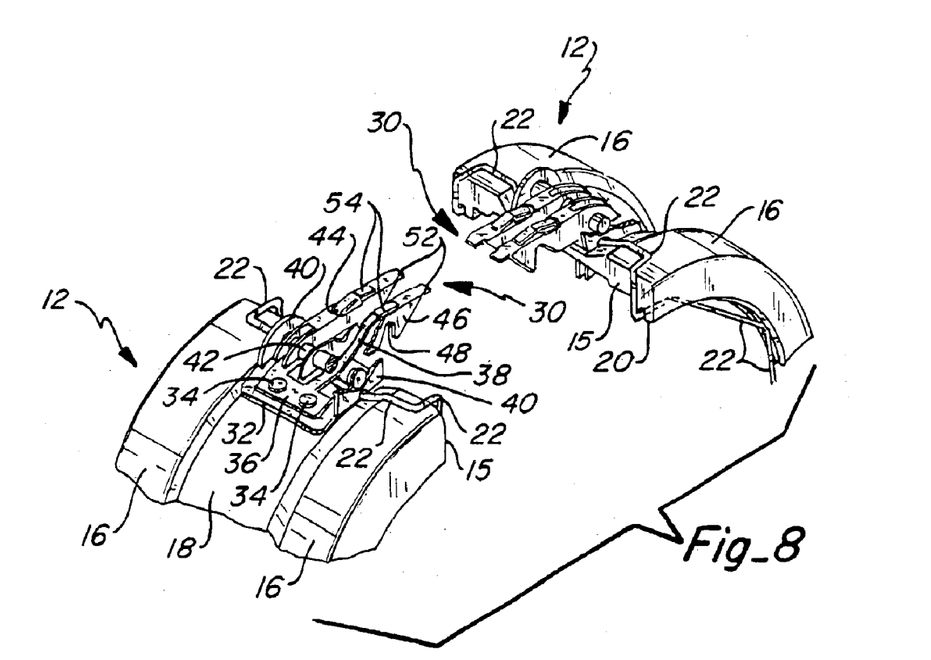
FIG. 8 is an enlarged fragmentary perspective view of the coupling assembly illustrating details of the engagement members.
Figure 8A:
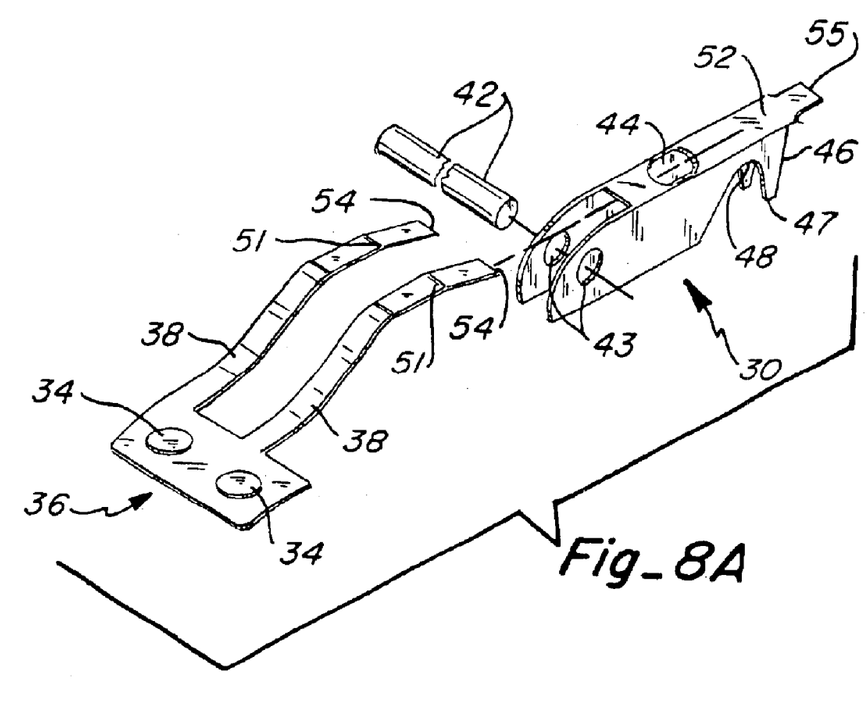
FIG. 8a illustrates a greatly enlarged engagement member and a greatly enlarged spring used to bias the engagement member.

Now also referring to FIGS. 3–8, additional structural details of the present invention are illustrated. Referring first to FIG. 3, a mounting plate 32 is connected to each of the coupling halves and is mounted as by rivets 34. Overlying each mounting plate 32 and also secured to the coupling halves by the rivets 34 is a spring member 36, best seen in FIGS. 8 and 8a. Spring member 36 has a base section which overlies the mounting plate 32, and a pair of spring fingers 38 which protrude away from the base section. Again referring to FIG. 8, each of the spring fingers 38 are routed underneath support bar 42 and then the free ends 54 of the spring fingers 38 are inserted through respective openings 44 formed on the corresponding engagement members 30. FIG. 8 also shows one of the engagement members 30 as partially broken away along with the portion of the support bar 42 in order to view the manner in which spring finger 38 attaches to the engagement member. FIG. 8a illustrates a spring member 36 and an engagement member 30 individually to better view their construction. Also referring to FIG. 9, it can be seen that the spring fingers 38 have a bend or crease 51 located at the point at which the spring fingers 38 protrude through the openings 44. The spring fingers 38 then extend substantially coextensively with the upper surfaces 52 of the engagement members. The spring fingers 38 remain attached to the respective engagement members 30 by having their free ends 54 extend through openings 44 and along surfaces 52.

Each support bar 42 extends through and between a pair of bar supports 40 which are spaced perpendicular extensions of the mounting plates 32. Each support bar 42 has an enlarged head and tip which keeps the support bar mounted in place. As best seen in FIGS. 8 and 8a, the engagement members 30 are generally channel shaped structures having fixed ends with a pair of openings 43 formed therethrough which receive the corresponding support bar 42. Accordingly, the engagement members are rotatable about their support bars.

FIG. 8 also illustrates the manner in which the bonding wires 22 traverse through the face sections 15 of the coupling halves. As shown, the bonding wires are bent at approximately a 90° angle at the faces 15, and then are bent again so that they traverse longitudinally across the coupling and underneath the mounting plates 32. The bonding wires 22 then extend between both of the grooves 29 on each coupling half. Accordingly, electrical conductivity is maintained through the coupling assembly by a bonding wire on each coupling half that electrically interconnects both flanges.

Figures 9, 10:
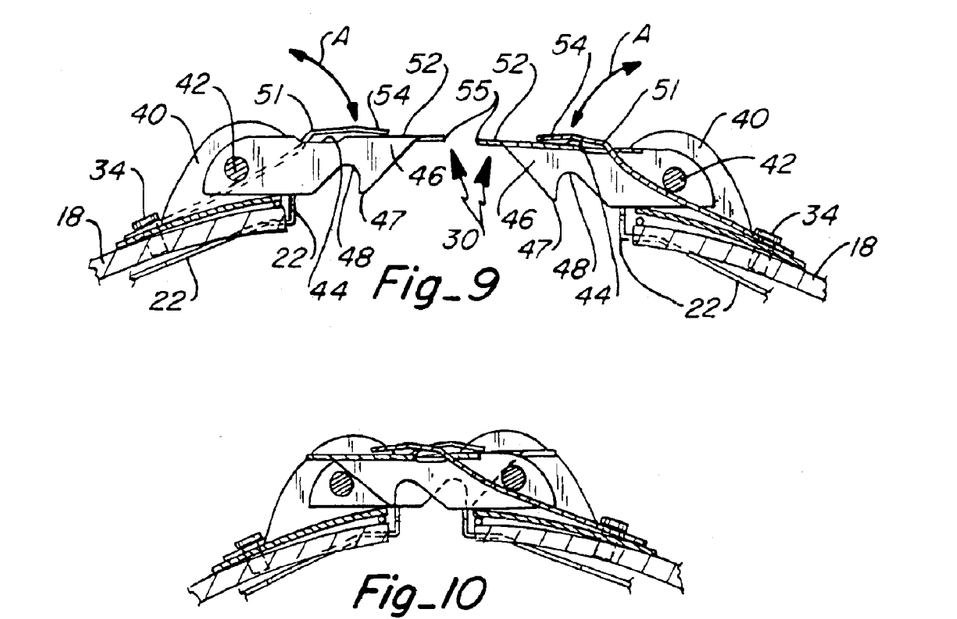
FIGS. 9–12 are greatly enlarged fragmentary vertical sections illustrating the manner in which the engagement members are positioned to place the coupling assembly in the locked position.

Referring now specifically to FIG. 9, directional arrows A are provided to illustrate the direction in which the engagement members 30 may rotate during coupling and uncoupling. Because of the spring fingers 38, the engagement members 30 are biased to resist rotation. The further the engagement members are rotated upwardly according to the view of FIG. 9, the greater the biasing force provided by spring fingers 38. Spring fingers 38 therefore act as leaf-type springs which resist rotation about an axis defined by their respective support bars 42.

Figure 11:
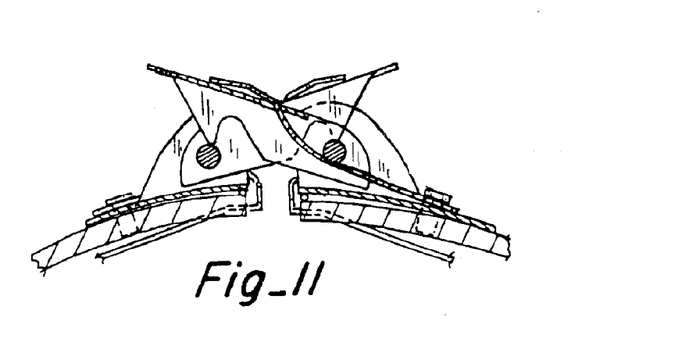
Figure 12:
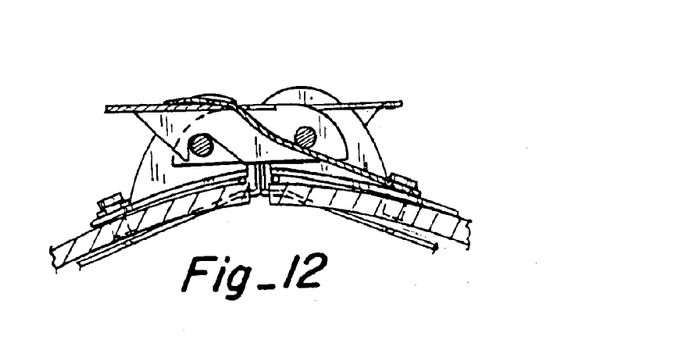

Now referring sequentially to FIGS. 9–12, these figures illustrate the manner in which the engagement members operate to place the coupling assembly in a locked or closed position. First, the flanges of the fluid lines to be connected are placed within one coupling half, and the other coupling half is rotated so that the engagement members 30 interweave in the manner shown in FIG. 3. As the other coupling half is further rotated, the first part of the engagement members which contact the support bars 42 are cam portions 46 which have sloping surfaces in relation to the orientation in which they strike the support bars 42. As shown in FIGS. 10 and 11, as the other coupling half is yet further rotated, the cam portions 46 slide upon the support bars 42 until the trailing edges 47 of the engagement members reach the top edge of the support bars. As the other coupling half is yet further rotated, the engagement members then snap to their locked position over the support pins due to the biasing forces of the spring fingers 38 whereby the support bars are received in the locking grooves 48. In the locked or closed position shown at FIG. 12, each of the engagement members are locked over their corresponding support bars.

If it is necessary to unlock the coupling assembly, the user simply rotates the free ends 55 of the engagement members in the unlocking direction, which in the view of the FIGS. 9–12 requires rotation of the ends 54 of the engagement members in an upward fashion. Inadvertent uncoupling is prevented because such uncoupling requires simultaneous manipulation of all of the engagement members. Although four engagement members are shown, it is still within the scope and spirit of the present invention to provide a coupling with a minimum of two engagement members, or more than four engagement members.

The coupling assembly of the present invention as well as the annular sleeve 68 may be optionally coated with any number of different types of conductive coatings. The types of coatings which could be used may include, without limitation, electroless nickel, nickel Teflon, or any other suitable coatings. These conductive coatings provide an additional means by which conductivity is maintained across the coupling assembly thereby further eliminating the possibility of an electrostatic charge buildup. Metal to metal contact of the flanges, sleeve 68, and the coupling creates an electrical path for preventing an electrostatic charge.

By the foregoing, numerous advantages of the present invention are readily apparent. A simple yet reliable coupling assembly is provided which not only has redundant locking features, but also has a bonding jumper feature which is incorporated with the locking feature thereby eliminating additional steps for placing the bonding jumper in operation. The particular manner in which the bonding wires traverse across the coupling halves also ensures that there are multiple points of contact of the bonding wire with the flanges of the fluid conveying members.

Because the components of the coupling assembly are externally mounted, the coupling assembly is easily inspected to determine proper positioning and functioning.

The unique arrangement of the spring fingers incorporated within the engagement members provides a locking means which prevents inadvertent uncoupling of the coupling assembly.

The bonding wires provide a reliable means to ensure conductivity across the coupling. Additionally, the bonding wires with their multiple points of contact on the flanges and coupling thereby enhance overall conductivity across the coupling. The electrically conductive coatings add yet another feature to the present invention which allows it to enhance conductivity thereby increasing its capacity to dissipate an electrical charge.

The foregoing invention has been described with respect to a preferred embodiment. However, various other changes and modifications may be made within the spirit and scope of the invention.

What is claimed is:

1. A coupling assembly for releasably interconnecting confronting ends of first and second fluid carrying conduit members wherein each has an annular flange fixedly attached to each of the confronting ends, said coupling assembly comprising:

a sleeve for circumferentially surrounding the flanges;

a pair of arcuate coupling halves pivotally joined at first adjacent ends for circumferentially surrounding said sleeve, each coupling half further having a web section, opposing transverse edges and a second end;

at least one bonding wire externally mounted to one of said coupling halves, said bonding wire having free ends secured to the coupling half proximate said first adjacent ends, said bonding wire extending around both said transverse edges of said coupling half and said bonding wire spanning said web;

at least a pair of engagement members, one engagement member of said pair of engagement members being mounted externally to each said second end of said coupling halves;

means mounted on each coupling half for securing said engagement members to their respective coupling halves; and means incorporated on each coupling half for biasing a corresponding engagement member, wherein said coupling halves are rotated to circumferentially surround said sleeve, and said engagement members are placed to engage said means for securing thereby placing said coupling assembly in a locked position.

2. A coupling assembly, as claimed in claim 1, wherein:
said means for securing includes a pair of support bars, one support bar being mounted on each second end of said pair of coupling halves, and each said support bars extending longitudinally across said web section.

3. A coupling assembly, as claimed in claim 1, wherein:
each said engagement member includes a first end rotatably mounted to said means for securing and a second end including a locking groove which engages said means for securing when said coupling assembly is in the locked position.

4. A coupling assembly, as claimed in claim 3, wherein:
each said engagement member further includes a cam portion which contacts said means for securing as said coupling halves are rotated to place the coupling assembly in the locked position.

5. A coupling assembly, as claimed in claim 1, wherein:
each coupling half includes a pair of annular ribs proximate said transverse edges thereby defining a pair of grooves for receiving corresponding portions of said bonding wire therein.

6. A coupling assembly, as claimed in claim 1, wherein:
said biasing means includes at least one spring finger which attaches to a corresponding engagement member and biases said engagement member for rotation about said means for securing.

7. A coupling assembly, as claimed in claim 1, wherein:
each coupling half includes a hinge section attached at said first end thereof, and said hinge section further includes a curved projection integral with said hinge section for receiving and securing one free end of said bonding wire.

8. A coupling assembly, as claimed in claim 1, wherein:
said coupling assembly is coated with an electrically conductive coating.

9. A coupling assembly, as claimed in claim 7, wherein:
each said hinge section is externally mounted to said coupling halves.

10. In combination with a pair of fluid carrying conduit members, a coupling assembly for releasably securing confronting ends of the conduit members, said combination comprising:
a sleeve for circumferentially surrounding and sealing said confronting ends therein;

a pair of arcuate coupling halves pivotally joined at first adjacent ends, said coupling halves each further having opposing transverse edges, a web section interconnecting said opposing transverse edges, and second ends;

a pair of bonding wires, one bonding wire mounted to each coupling half, each bonding wire traversing along each transverse edge and across said web section so to make a contact at multiple points along said confronting ends of the conduit members, and each said bonding wire spanning its corresponding coupling half thereby forming a continuous conductive path across said coupling;

at least a pair of engagement members rotatably mounted to corresponding support bars secured proximate said second ends of said coupling halves; and a spring member attached to each engagement member for providing a biasing force to resist rotation of each engagement member about its corresponding support bar, wherein said coupling halves are rotated to circumferentially surround said sleeve, and said engagement members are placed to engage the support bar on the opposing coupling half thereby placing said coupling in a locked position.

11. The combination, as claimed in claim 10, wherein:
each engagement member further includes a locking groove formed thereon which receives the support bar when the coupling is in the locked position.

12. The combination, as claimed in claim 10, wherein:
each engagement member further includes a cam portion which contacts the support bar as the coupling halves are rotated to place the coupling in the locked position.

13. The combination, as claimed in claim 10, wherein:
each coupling half includes a pair of annular ribs proximate said transverse edges defining a pair of grooves for receiving corresponding portions of said bonding wire therein.

14. A coupling assembly for releasably interconnecting confronting ends of first and second fluid carrying conduit members wherein each has an annular flange fixedly attached to each of the confronting ends, said coupling assembly comprising:
a sleeve for circumferentially surrounding and sealing said confronting ends therein;

a pair of arcuate coupling halves pivotally joined at first adjacent ends, said coupling halves each having opposing transverse edges and second ends;

a pair of bonding wires, one bonding wire mounted to each coupling half, each bonding wire traversing along each transverse edge so to make a contact at multiple points along said confronting ends of the conduit members, and each said bonding wire spanning its corresponding coupling half thereby forming a continuous conductive path across said coupling;

at least a pair of engagement members rotatably mounted to corresponding support bars secured proximate said second ends of said coupling halves;

a spring member attached to each engagement member for providing a biasing force to resist rotation of each engagement member about its corresponding support bar, wherein said coupling halves are rotated to circumferentially surround said sleeve, and said engagement members are placed to engage the support bar on the opposing coupling half thereby placing said coupling in a locked position; and each coupling half includes a hinge section attached at said first end thereof, and said hinge section further includes an integral curved projection for receiving and securing one free end of said bonding wire.

15. A coupling assembly, as claimed in claim 10, wherein: said coupling halves are coated with an electrically conductive coating.

16. A method of releasably interconnecting confronting ends of first and second fluid carrying conduit members wherein an annular flange is attached to each of the confronting ends and has a sealing ring therearound, a sleeve circumferentially surrounding the sealing rings, and a pair of symmetrical arcuate coupling halves pivotally joined together at first adjacent ends and being rotatable to surround said sleeve and flanges to bring second ends of said coupling halves to a locking position wherein each second end of each coupling half includes at least one engagement member rotatably mounted over an opposed support bar and said engagement member being biased to resist rotation about the opposed support bar each coupling half having a bonding wire, each bonding wire extending around opposing transverse edges of each of the coupling halves such that the bonding wires are placed in contact with metallic portions of the fluid carrying conduits, and each bonding wire extending perpendicular with respect to said transverse edges thus bridging a web of its corresponding coupling half thereby creating an electrical path joining the fluid carrying conduits, said method comprising the steps of:

rotating the second ends of the coupling halves together;

contacting each engagement member against an opposing support bar of the other coupling half;

further rotating the second ends of the coupling halves together to overcome the biasing forces placed on each engagement member; and engaging the support bars within locking grooves of each of the engagement members thereby placing the coupling in a locked position.

17. A coupling assembly for releasably interconnecting confronting ends of first and second fluid carrying conduit members wherein each conduit member has an annular flange fixedly attached to each of the confronting ends, said coupling assembly comprising:

a sleeve for circumferentially surrounding the flanges;

a pair of arcuate coupling halves pivotally joined at first adjacent ends for circumferentially surrounding said sleeve, each coupling half further having a, web opposing transverse edges, and a second end;

means for creating an electrically conductive path across the coupling assembly, said means for creating being externally mounted to at least one of said coupling halves, said means for creating extending around both said transverse edges of the at least one coupling half, and said means for creating spanning across said web, said means for creating being a unitary and continuous member;

at least a pair of biased engagement members, one engagement member of said at least a pair of engagement members being mounted externally to each said second end of said coupling halves, said engagement members being positionable in a locked position thereby securing the confronting ends of the fluid carrying conduit members.

18. A coupling assembly for releasably interconnecting confronting ends of first and second fluid carrying conduit members wherein each conduit member has an annular flange fixedly attached to each of the confronting ends, said coupling assembly comprising:

means for sealing the flanges in the coupling assembly, said means for sealing circumferentially surrounding the flanges;

a pair of arcuate coupling halves pivotally joined at first adjacent ends for circumferentially surrounding said means for sealing, each coupling half further having a web, opposing transverse edges, and a second end;

means for creating an electrically conductive path across the coupling assembly, said means for creating being externally mounted to at least one of said coupling halves, said means for creating extending around both said transverse edges of the at least one coupling half, and said means for creating spanning across said web, said means for creating being a unitary and continuous member;

at least a pair of biased engagement members, one engagement member of said at least a pair of engagement members being mounted externally to each said second end of said coupling halves, said engagement members being positionable in a locked position thereby securing the confronting ends of the fluid carrying conduit members.

19. A coupling assembly for releasably interconnecting confronting ends of first and second fluid carrying conduit members said coupling assembly comprising:

a sleeve;

a pair of arcuate coupling halves pivotally joined at first adjacent ends for circumferentially surrounding said sleeve, each coupling half further having a web section, opposing transverse edges and a second end;

at least one bonding wire externally mounted to one of said coupling halves, said bonding wire having free ends secured to the coupling half proximate said first adjacent ends, said bonding wire extending around both said transverse edges of said coupling half and said bonding wire spanning said web;

at least a pair of engagement members, one engagement member of said pair of engagement members mounted externally to each said second end of said coupling halves; and means incorporated on each coupling half for biasing a corresponding engagement member, wherein said coupling halves are rotated to circumferentially surround said sleeve, and said engagement members are placed in an engaging position thereby placing said coupling assembly in a locked position.

20. A coupling assembly for releasably interconnecting confronting ends of first and second fluid carrying conduit members said coupling assembly comprising:

means for sealing the confronting ends in the coupling assembly, said means for sealing circumferentially surrounding the confronting ends;

a pair of arcuate coupling halves pivotally joined at first adjacent ends for circumferentially surrounding said means for sealing, each coupling half further having opposing transverse edges and a second end;

means for creating an electrically conductive path across the coupling assembly, said means for creating being externally mounted to at least one of said coupling halves, said means for creating extending circumferentially around said at least one coupling half and extending transversely across said at least one coupling half, said means for creating being a unitary and continuous member;

at least a pair of biased engagement members, one engagement member of said at least a pair of engagement members being mounted externally to each said second end of said coupling halves, said engagement members being positionable in a locked position thereby securing the confronting ends of the fluid carrying conduit members.

21. A coupling assembly for releasably interconnecting confronting ends of first and second fluid carrying conduit members, said coupling assembly comprising:

a pair of arcuate coupling halves pivotally joined at first adjacent ends for circumferentially surrounding said conduit members, each coupling half further having a web, opposing transverse edges and a second end;

at least one bonding wire externally mounted to one of said coupling halves, said bonding wire extending around both said transverse edges of said coupling half and said bonding wire spanning said web;

at least a pair of engagement members, one engagement member of said pair of engagement members being mounted externally to each said second end of said coupling halves;

means mounted on each coupling half for securing said engagement members to their respective coupling halves; and means incorporated on each coupling half for biasing a corresponding engagement member, wherein said coupling halves are rotated to circumferentially surround said conduit members, and said engagement members are placed to engage said means for securing thereby placing said coupling assembly in a locked position.

22. A coupling assembly, as claimed in claim 21, wherein:
said means for securing includes a pair of support bars, one support bar being mounted on each second end of said pair of coupling halves, and each said support bars extending longitudinally across said web section.

23. A coupling assembly, as claimed in claim 21, wherein:
each said engagement member includes a first end rotatably mounted to said means for securing and a second end including a locking groove which engages said means for securing when said coupling assembly is in the locked position.

24. A coupling assembly, as claimed in claim 21, wherein:
each said engagement member further includes a cam portion which contacts said means for securing as said coupling halves are rotated to place the coupling assembly in the locked position.

25. A coupling assembly, as claimed in claim 21, wherein:
each coupling half includes a pair of annular ribs proximate said transverse edges thereby defining a pair of grooves for receiving corresponding portions of said bonding wire therein.

26. A coupling assembly, as claimed in claim 21, wherein:
said biasing means includes at least one spring finger which attaches to a corresponding engagement member and biases said engagement member for rotation about said means for securing.

27. A coupling assembly, as claimed in claim 21, wherein:
each coupling half includes a hinge section attached at said first end thereof, and said hinge section further includes a curved projection integral with said hinge section for receiving and securing one free end of said bonding wire.

28. A coupling assembly, as claimed in claim 21, wherein:
said coupling assembly is coated with an electrically conductive coating.

29. A coupling assembly, as claimed in claim 27, wherein:
each said hinge section is externally mounted to said coupling halves.

30. In combination with a pair of fluid carrying conduit members, a coupling assembly for releasably securing confronting ends of the conduit members, said combination comprising:

a pair of arcuate coupling halves pivotally joined at first adjacent ends, said coupling halves each further having opposing transverse edges, a web interconnecting said opposing transverse edges, and second ends;

a pair of bonding wires, one bonding wire mounted to each coupling half, each bonding wire traversing along each transverse edge and across said web so to make a contact at multiple points along said confronting ends of the conduit members, and each said bonding wire spanning its corresponding coupling half thereby forming a continuous conductive path across said coupling;

at least a pair of engagement members rotatably mounted to corresponding support bars secured proximate said second ends of said coupling halves; and a spring member attached to each engagement member for providing a biasing force to resist rotation of each engagement member about its corresponding support bar, wherein said coupling halves are rotated to circumferentially surround said confronting ends of the conduit members, and said engagement members are placed to engage the support bar on the opposing coupling half thereby placing said coupling in a locked position.

31. The combination, as claimed in claim 30, wherein:
each engagement member further includes a locking groove formed thereon which receives the support bar when the coupling is in the locked position.

32. The combination, as claimed in claim 30, wherein:
each engagement member further includes a cam portion which contacts the support bar as the coupling halves are rotated to place the coupling in the locked position.

33. The combination, as claimed in claim 30, wherein:
each coupling half includes a pair of annular ribs proximate said transverse edges defining a pair of grooves for receiving corresponding portions of said bonding wire therein.

34. The combination, as claimed in claim 30, wherein:
each coupling half includes a hinge section attached at said first end thereof, and said hinge section further includes an integral curved projection for receiving and securing one free end of said bonding wire.

35. A coupling assembly, as claimed in claim 30, wherein:
said coupling halves are coated with an electrically conductive coating.

36. A coupling assembly for releasably interconnecting confronting ends of first and second fluid carrying conduit members, said coupling assembly comprising:

a pair of arcuate coupling halves pivotally joined at first adjacent ends for circumferentially surrounding said conduit members, each coupling half further having a web, opposing transverse edges, and a second end;

means for creating an electrically conductive path across the coupling assembly, said means for creating being externally mounted to at least one of said coupling halves, said means for creating extending around both said transverse edges of the at least one coupling half, and said means for creating spanning across said web, said means for creating being a unitary and continuous member;

at least a pair of biased engagement members, one engagement member of said at least a pair of engagement members being mounted externally to each said second end of said coupling halves, said engagement members being positionable in a locked position thereby securing the confronting ends of the fluid carrying conduit members.

37. A coupling assembly for releasably interconnecting confronting ends of first and second fluid carrying conduit members said coupling assembly comprising:

a pair of arcuate coupling halves pivotally joined at first adjacent ends for circumferentially surrounding said conduit members, each coupling half further having opposing transverse edges and a second end;

means for creating an electrically conductive path across the coupling assembly, said means for creating being externally mounted to at least one of said coupling halves, said means for creating extending circumferentially around said at least one coupling half and extending transversely across said at least one coupling half, said means for creating being a unitary and continuous member;

at least a pair of biased engagement members, one engagement member of said at least a pair of engagement members being mounted externally to each said second end of said coupling halves, said engagement members being positionable in a locked position thereby securing the confronting ends of the fluid carrying conduit members.

38. A coupling assembly for releasably interconnecting confronting ends of first and second fluid carrying conduit members, said coupling assembly comprising:

a pair of arcuate coupling halves pivotally joined at first adjacent ends for circumferentially surrounding said confronting ends of said first and second fluid carrying conduit members;

at least one bonding wire externally mounted to one of said coupling halves, said bonding wire extending circumferentially with respect to one of said fluid carrying conduit members;

at least a pair of engagement members, one engagement member of said pair of engagement members being mounted externally to each said coupling halves;

means mounted on each coupling half for securing said engagement members to their respective coupling halves; and a spring member attached to each engagement member for providing a biasing force to resist rotation of said engagement members about their respective means for securing, each said spring member including a base section mounted to the respective coupling half, and an integral spring finger protruding away from the base section and secured to the corresponding engagement member.

* * * * *